May 16, 1961 D. E. LE CLAIR 2,984,449
SEALING MEANS FOR VALVE CLOSURE
Filed June 26, 1959
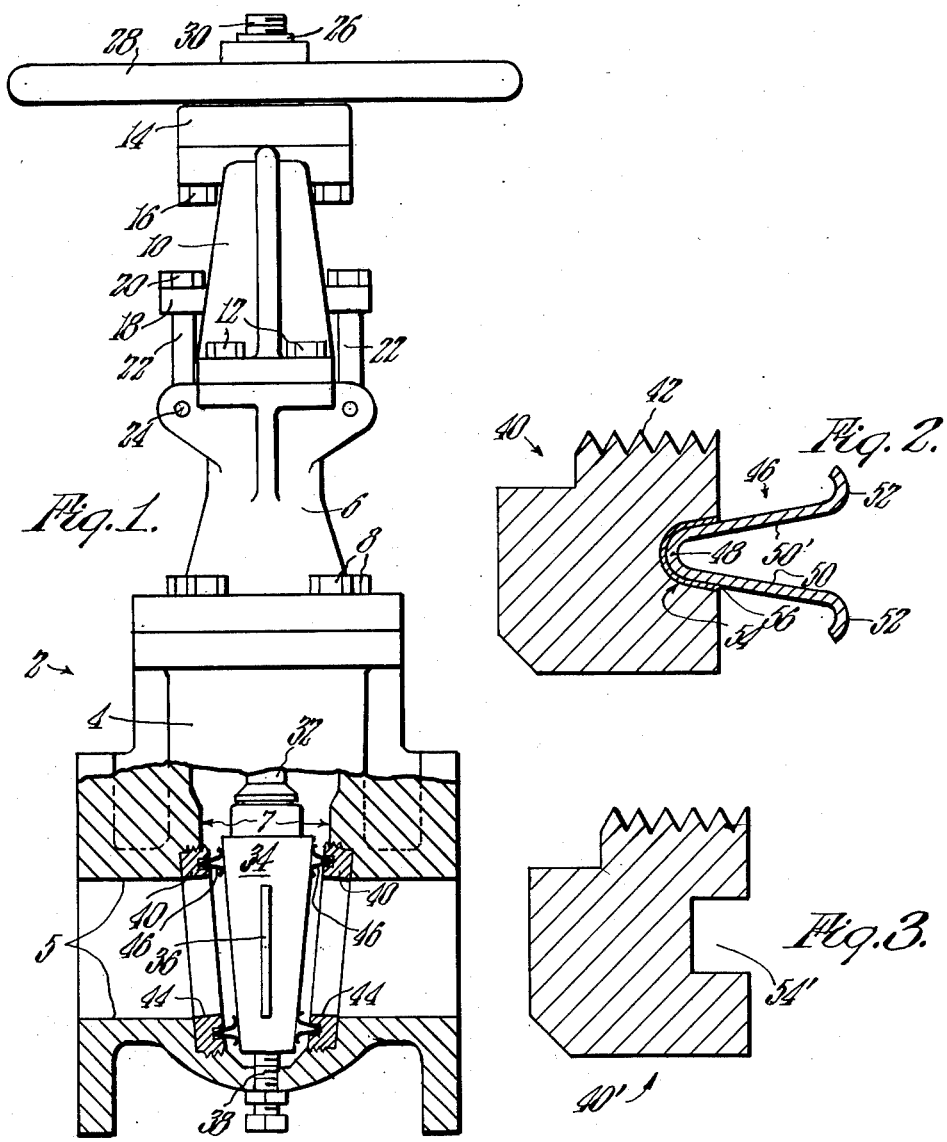
INVENTOR.
Donald E. LeClair
BY Ross + Ross, Attys.

United States Patent Office 2,984,449
Patented May 16, 1961

2,984,449

SEALING MEANS FOR VALVE CLOSURE

Donald E. Le Clair, Fairview, Mass., assignor, by mesne assignments, to The Chapman Valve Manufacturing Company, Chicago, Ill., a corporation of Delaware Filed June 26, 1959, Ser. No. 823,096

1 Claim. (Cl. 251—172)

This invention relates to new and useful improvements in structural refinements in valve apparatus, and is directed more particularly to the provision of seating and sealing means for the movable valve closing member or closure of a valve apparatus in the closed position of said closure.

It is the principal object of the invention to provide an inventively novel and improved means in valve apparatus having seating and sealing means associated with a valve body which is characterized by flexibility, and which is engageable by the valve closing member in its closed position to provide a non-leakable pressure seal around the valve closure member.

The novel features of the invention will, for purposes of disclosure, be described in connection with a manually operable gate valve, but it will be understood of course that said features may be used in connection with valves of various types which are manually or otherwise operated.

According to novel features of the invention, in a general way, a pair of solid or retaining rings are provided, each of which is preferably screw threaded in a valve body and has integral therewith an annular thin-walled and flexible metallic seating and sealing ring. The seating or sealing ring is of generally V shape in cross section, having a base secured to its respective retaining ring and inner and outer side portions extending therefrom and terminating in outwardly curving extremities to provide concentrically spaced seating surfaces for engaging the valve closing member.

Preferably, said inner and outer side portions of the seating and sealing rings relatively diverge outwardly from the retaining ring and terminate in outwardly curving extremities or seating surfaces engageable with opposite faces of a plug to obviate the possibility of the extremities catching on the closure or plug.

The sealing rings are each so formed and arranged that the outer curved extremities thereof are concentrically related as to each other and provide dual line contacts with a side of the valve closure member, commonly called the plug, as it is moved to its closed position.

The sealing rings have flexible characteristics so that the side portions thereof may deflect when the plug is in the closed position or is wedged between the rings on the opposite sides thereof.

The invention resides in the particular arrangement, construction, and relationship of the various elements of the valve apparatus as exemplified in the detailed disclosure hereinafter set forth wherein the hereinabove defined objects of the invention will be apparent.

Other objects and advantages of the present invention will be in part obvious or in part pointed out more fully hereinafter. All will become apparent as the detailed description of the exemplary form of the invention intended to be protected by Letters Patent proceeds below.

In the drawings:

Fig. 1 is a side elevational view, more or less diagrammatic, of a gate valve embodying the novel features of the invention with certain parts thereof being shown in section for the sake of clarity;

Fig. 2 is an enlarged cross sectional view through an integral solid retaining ring and sealing ring of the invention; and Fig. 3 is an enlarged cross sectional view through a modified form of retaining ring similar to that shown in Fig. 2.

Referring now to the drawing more in detail, the novel features of the invention will be described in detail, it being understood that said features may be used in connection with various types of valves.

A gate valve represented by 2, is of the usual type having a body 4 and a bonnet 6 secured thereto as by bolts 8.

A yoke 10 is secured to the upper end of the bonnet 6 by bolts 12 or the like, and a yoke cap 14 is secured to the upper end of the yoke 10 by bolts 16.

A flange 18 between opposite sides of the yoke 10 carries a follower of a stuffing box, not shown, and is urged downwardly by nuts 20 of bolts 22 which are pivoted at 24 to the yoke 10, in the usual manner.

A yoke nut 26 is rotatable in the yoke cap 14, and has a hand wheel 28 secured thereto in the ordinary manner. Said nut 26 is internally threaded, and the upper end 30 of a stem or spindle 32 is in screw threaded engagement therewith.

A closure or plug 34, of usual form, is connected at its upper side to the lower end of the stem or spindle 32, in the usual manner. As the hand wheel 28 is turned in one direction or the other, the plug 34 is moved between a lower closed position, as shown, and an upper open position away therefrom.

The body 4 is provided with the usual passage or waterway 5 and is also provided with a space or chamber 7 which intersects said passage 5. The plug enters the chamber 7 in its lower closed position.

As is known, it is common practice to provide opposite sides of the plug 34 with guide means, indicated by 36, which are in sliding engagement with cooperating means in the body, not shown, whereby the plug in its opening and closing movements will be guided in a straight line.

The body is provided in its lower side with a stop means to limit downward movement of the plug. Such may comprise a bolt or screw 38 so that the closed position of the plug may be adjusted, as desired, all to prevent over-deflection of the seating and sealing rings to be described.

Stop means (not shown) may be provided in association with the upper portion of the spindle, should same be desired.

A pair of retaining or solid rings 40 are provided and may be formed with screw threads 42. The body 4 is appropriately screw threaded to receive said rings. Said rings are provided with central openings 44.

Annular seating or sealing rings generally indicated by 46 are provided which are of generally V shape in cross section, and have bases 48 with inner and outer side portions 50 and 50' respectively relatively diverging from the bases and terminating in outwardly curving extremities 52.

The bases 48 of the rings 46 are disposed in annular grooves such as 54 which are provided in the rings 40.

Where the solid rings and the sealing rings are of metal, the bases may be secured in the grooves by any suitable means, such as by welding, brazing, or the like, as indicated by 56, whereby the retaining rings and the sealing rings are integral.

The grooves in which the bases of the sealing rings are secured may take any desired form such as the groove 54' of the ring 40', as shown in Fig. 3.

The rings 46 may be formed in any suitable manner from a relatively thin flexible material so as to offer the desired V shape cross section. They may be formed from any appropriate metal offering good tensile strength and a high yield point. Preferentially, they will be adapted for heat treatment and will possess the desired flexibility or resiliency with ability to recover following deflection thereof as will shortly be explained.

United as they are, the solid ring and sealing ring provide a unitary structure for ready and easy assembly in the valve body or removal therefrom for replacement or reconditioning or like purposes.

The particular metal from which the rings 46 will be formed is more or less dependent upon the service in which the valve embodying the rings 46 is to be employed. Rings formed from AISI 304 or 410 stainless steels may be used to advantage in some services, although there are a large variety of metals, and even certain plastics which may be used for certain services.

It will be desirable that the material of the rings be such that the rings deflect under load for the sealing function, and, without exceeding the yield point, recover adequately when relieved of said load.

The rings have the concentric annular curved extremities so as to provide spaced inner and outer concentric surfaces for contact with the sides of the plug in the closed position thereof, and further to provide a positive seal even though the coacting plug may have somewhat irregular surfaces.

The plug, in its closed position, will be wedged between the concentric extremities or seating surfaces of the sealing rings at opposite sides thereof so that there will be deflection of said rings even at low pressures.

It will be noted that each sealing ring provides dual concentric plug engaging seating surfaces in spaced relation for sealing contact therewith, which due to the characteristics of the sealing rings provide positive tight seals in closed position of the plug.

According to the invention, it is desirable that the rings 46 have such flexibility relative to the pressure at the pressure side of the plug in its closed position that the pressure will deflect the inner side 50 of a ring radially outwardly. Thereby, the extremity of said inner side of a ring in engagement with a side of a plug will function as a tight pressure seal.

The material from which the rings 46 are made, thickness and degree of flexibility thereof may be selected as will provide an adequate pressure seal for a predetermined pressure or range of pressures.

By securing a sealing ring to a retaining ring, the possibility of leakage between said rings is obviated.

Various changes and modifications may be made in the form of the invention within the spirit and scope thereof, and it is desired to be limited, if at all, by the appended claim rather than by the foregoing description.

I claim:

In a valve structure having a flow passage therethrough and a valve closure receiving chamber intersecting the passage, a valve closure receivable in the chamber in closed position thereof and having opposite faces, sealing means surrounding the flow passage on each side of the chamber, each said sealing means including an annular ring formed from a flexible metal to have a V shaped cross section provided with a base and spaced outwardly diverging side portions extending therefrom terminating in outwardly curving extremities forming concentrically arranged surfaces for seating and sealing engagement with the adjacent face of said valve closure, means to force said closure means tightly against said sealing means whereby said valve closure in its closed position acts to deflect said sealing means for the establishment of tight seal with said valve closure.

References Cited in the file of this patent

UNITED STATES PATENTS

| | | |
|---|---|---|
| 1,054,150 | Thorsby | Feb. 25, 1913 |
| 1,476,344 | McGee | Dec. 4, 1923 |
| 2,582,877 | Mekler | Jan. 15, 1952 |
| 2,810,543 | Bryant | Oct. 22, 1957 |